United States Patent
Charles (10) Patent No.: US 12,478,505 B2
(45) Date of Patent: Nov. 25, 2025

(54) VISUALIZATION AND TREATMENT OF MEDIA OPACITY IN EYE

(71) Applicant: Alcon Inc., Fribourg (CH)

(72) Inventor: Steven T. Charles, Memphis, TN (US)

(73) Assignee: Alcon Inc., Fribourg (CH)

( * ) Notice: Subject to any disclaimer, the term of this patent is extended or adjusted under 35 U.S.C. 154(b) by 507 days.

(21) Appl. No.: 17/126,941

(22) Filed: Dec. 18, 2020

(65) Prior Publication Data

US 2022/0031511 A1  Feb. 3, 2022

Related U.S. Application Data

(60) Provisional application No. 63/076,942, filed on Sep. 11, 2020, provisional application No. 63/059,399, filed on Jul. 31, 2020.

(51) Int. Cl.
*A61F 9/008* (2006.01)
*A61B 3/10* (2006.01)
*G02B 27/28* (2006.01)

(52) U.S. Cl.
CPC ............ *A61F 9/00825* (2013.01); *A61B 3/10* (2013.01); *G02B 27/286* (2013.01); *A61F 2009/00874* (2013.01)

(58) Field of Classification Search
CPC ........ A61F 9/00825; A61F 2009/00874; A61F 9/009; A61F 2009/00848; A61B 3/10;
(Continued)

(56) References Cited

U.S. PATENT DOCUMENTS 3,780,979 A   12/1973  De Guillebon
4,357,088 A   11/1982  Pomerantzeff
(Continued)

FOREIGN PATENT DOCUMENTS

AU   2018274939 B2 *  6/2020  ........... A61B 3/0008
CN     210009227 U     2/2020
(Continued)

OTHER PUBLICATIONS

Mojana F, Kozak I, Oster SF, Cheng L, Bartsch DU, Brar M, Yuson RM, Freeman WR. Observations by spectral-domain optical coherence tomography combined with simultaneous scanning laser ophthalmoscopy: imaging of the vitreous. Am J Ophthalmol. Apr. 2010;149(4):641-50. (Year: 2010).*

(Continued)

*Primary Examiner* — William J Levicky
(74) *Attorney, Agent, or Firm* — PATTERSON + SHERIDAN, LLP (57) ABSTRACT

A system for treating a media opacity in a vitreous media of an eye includes a visualization module adapted to provide visualization data of a portion of the eye via one or more viewing beams. The system includes a laser module adapted to selectively generate a treatment beam directed towards the media opacity in order to disrupt the media opacity. The laser module and the visualization module have a shared aperture for guiding the treatment beam and the one or more viewing beams towards the eye, the shared aperture being centered about a central axis. A controller is configured to acquire one or more defining parameters of the media opacity and determine when the media opacity is with a predefined target zone of a real-time viewing window. The media opacity is treated with the treatment beam when the media opacity is within the predefined target zone.

20 Claims, 5 Drawing Sheets

(58) Field of Classification Search
CPC ..... A61B 3/1015; A61B 3/117; G02B 27/286; G02B 21/0092; G02B 21/10; G02B 3/14
See application file for complete search history.

(56) References Cited

U.S. PATENT DOCUMENTS

| | | | |
|---|---|---|---|
| 5,312,396 A | 5/1994 | Feld | |
| 5,909,270 A * | 6/1999 | Moser | G01B 11/255 351/212 |
| 6,142,630 A | 11/2000 | Koester | |
| 6,322,556 B1 | 11/2001 | Gwon | |
| 6,789,900 B2 | 9/2004 | Van De Velde | |
| 7,374,287 B2 | 5/2008 | Van De Velde | |
| 7,510,282 B2 | 3/2009 | Ueno | |
| 7,520,613 B2 * | 4/2009 | Saito | A61B 3/12 351/205 |
| 7,703,922 B2 | 4/2010 | Van De Velde | |
| 8,480,659 B2 | 7/2013 | Frey et al. | |
| 8,652,602 B1 | 2/2014 | Dolla | |
| 8,783,868 B2 | 7/2014 | Qiu | |
| 8,876,808 B2 | 11/2014 | Feklistov et al. | |
| 8,994,753 B2 | 3/2015 | Nakano | |
| 9,033,500 B2 | 5/2015 | Utsunomiya | |
| 9,603,519 B2 | 3/2017 | Bor et al. | |
| 9,675,243 B2 | 6/2017 | Sasak et al. | |
| 9,789,002 B2 | 10/2017 | Van De Velde | |
| 10,130,511 B2 * | 11/2018 | Dantus | A61F 9/00827 |
| 10,478,342 B2 * | 11/2019 | Dick | A61F 9/0084 |
| 10,555,835 B2 * | 2/2020 | Schuele | A61F 9/00825 |
| 2007/0258094 A1 | 11/2007 | Izatt et al. | |
| 2007/0291277 A1 | 12/2007 | Everett | |
| 2009/0073384 A1 | 3/2009 | Warden | |
| 2009/0137989 A1 | 5/2009 | Kataoka | |
| 2009/0196477 A1 | 8/2009 | Cense et al. | |
| 2010/0123873 A1 | 5/2010 | Raymond | |
| 2010/0152847 A1 | 6/2010 | Padrick | |
| 2011/0077557 A1 | 3/2011 | Wing et al. | |
| 2012/0281235 A1 | 11/2012 | Murata | |
| 2013/0131652 A1 | 5/2013 | Dick | |
| 2013/0173029 A1 | 7/2013 | Caldeira et al. | |
| 2014/0216468 A1 | 8/2014 | Goldshleger | |
| 2014/0257257 A1 * | 9/2014 | Grant | A61F 9/00825 606/4 |
| 2014/0268036 A1 | 9/2014 | Ketterling et al. | |
| 2014/0276674 A1 | 9/2014 | Lee | |
| 2015/0190278 A1 * | 7/2015 | Gooding | A61F 9/008 606/4 |
| 2015/0342782 A1 | 12/2015 | Mordaunt | |
| 2016/0058617 A1 | 3/2016 | Luttrull et al. | |
| 2016/0074214 A1 * | 3/2016 | Palanker | A61F 2/1602 606/6 |
| 2016/0074221 A1 | 3/2016 | Tassignon et al. | |
| 2016/0166431 A1 | 6/2016 | Vogler et al. | |
| 2016/0227999 A1 | 8/2016 | An et al. | |
| 2016/0235588 A1 | 8/2016 | Hart et al. | |
| 2016/0256324 A1 | 9/2016 | Suzuki | |
| 2016/0278629 A1 | 9/2016 | Schuele | |
| 2016/0302969 A1 | 10/2016 | Yamamoto | |
| 2017/0181625 A1 | 6/2017 | Kawakami et al. | |
| 2017/0252213 A1 | 9/2017 | Furuuchi et al. | |
| 2017/0326003 A1 | 11/2017 | Schuele et al. | |
| 2018/0028354 A1 | 2/2018 | Heeren | |
| 2018/0028355 A1 | 2/2018 | Raksi | |
| 2018/0140257 A1 | 5/2018 | Govindjee et al. | |
| 2018/0206719 A1 | 7/2018 | Adler et al. | |
| 2018/0317767 A1 | 11/2018 | Ryan | |
| 2018/0353064 A1 | 12/2018 | Soetikno et al. | |
| 2018/0368915 A1 | 12/2018 | Xia et al. | |
| 2019/0159933 A1 | 5/2019 | Romano et al. | |
| 2019/0282403 A1 | 9/2019 | Barrett et al. | |
| 2019/0290124 A1 | 9/2019 | Laforest et al. | |
| 2019/0313903 A1 | 10/2019 | Mckinnon | |
| 2019/0365569 A1 | 12/2019 | Skovgaard | |
| 2020/0038241 A1 | 2/2020 | Wang et al. | |
| 2020/0060873 A1 | 2/2020 | Heeren | |
| 2020/0085292 A1 * | 3/2020 | Fukuma | A61B 3/0025 |
| 2020/0129336 A1 | 4/2020 | Schuele et al. | |
| 2020/0130103 A1 | 4/2020 | Choi | |
| 2020/0192080 A1 * | 6/2020 | Karam | G02B 3/14 |
| 2020/0196853 A1 | 6/2020 | Van Hemert et al. | |
| 2020/0273218 A1 | 8/2020 | Camino et al. | |
| 2020/0397289 A1 | 12/2020 | Ralston | |
| 2020/0400422 A1 | 12/2020 | Ralston | |
| 2021/0100450 A1 | 4/2021 | Amma | |
| 2021/0186753 A1 | 6/2021 | Al-qaisi et al. | |
| 2021/0275009 A1 | 9/2021 | Yates | |
| 2021/0378507 A1 | 12/2021 | Wallace | |
| 2021/0386586 A1 | 12/2021 | Bor | |
| 2022/0012459 A1 | 1/2022 | Schwiegerling | |
| 2022/0031511 A1 | 2/2022 | Charles | |
| 2023/0157889 A1 | 5/2023 | Bor | |

FOREIGN PATENT DOCUMENTS

| | | |
|---|---|---|
| CN | 108371542 B | 4/2020 |
| CN | 109196333 B | 12/2020 |
| CN | 111281651 B | 12/2020 |
| CN | 112862782 A | 5/2021 |
| CN | 112587302 B | 6/2021 |
| CN | 112587304 B | 6/2021 |
| DE | 19705044 A1 | 8/1998 |
| DE | 102019007147 A1 | 4/2021 |
| DE | 102019007148 A1 | 4/2021 |
| EP | 0770370 A2 | 2/1997 |
| EP | 1212022 B1 | 3/2005 |
| EP | 1563785 A1 | 8/2005 |
| EP | 1638452 B1 | 10/2006 |
| EP | 1838212 A1 | 10/2007 |
| EP | 2144552 A1 | 1/2010 |
| EP | 1928297 B1 | 11/2010 |
| EP | 2459138 A2 | 6/2012 |
| EP | 2525706 A2 | 11/2012 |
| EP | 2898820 A1 | 7/2015 |
| EP | 3061429 A1 | 8/2016 |
| EP | 2890340 B1 | 2/2017 |
| EP | 3459487 A1 | 3/2019 |
| EP | 3501463 A1 | 6/2019 |
| EP | 3636137 A1 | 4/2020 |
| EP | 3861924 A1 | 8/2021 |
| GB | 2469249 A | 10/2010 |
| JP | 2000350742 A | 12/2000 |
| JP | 2015093169 A | 5/2015 |
| JP | 5767014 B2 | 6/2015 |
| JP | 2017176558 A | 10/2017 |
| JP | 6410468 B2 | 10/2018 |
| JP | 2018196821 A | 12/2018 |
| JP | 2018196822 A | 12/2018 |
| JP | 2019010132 A | 1/2019 |
| JP | 2020022569 A | 2/2020 |
| JP | 6736304 B2 | 7/2020 |
| JP | 6839902 B2 | 2/2021 |
| RU | 2661016 C1 | 7/2018 |
| RU | 2692666 C1 | 6/2019 |
| RU | 2695629 C1 | 7/2019 |
| RU | 2710058 C2 | 12/2019 |
| RU | 2726468 C1 | 7/2020 |
| WO | 9958047 A1 | 11/1999 |
| WO | 0137769 A1 | 5/2001 |
| WO | 0195791 A1 | 12/2001 |
| WO | 2007059189 A2 | 5/2007 |
| WO | 2009033110 A2 | 3/2009 |
| WO | 2009036104 A2 | 3/2009 |
| WO | 2009039315 A2 | 3/2009 |
| WO | 2009059400 A1 | 5/2009 |
| WO | 2010117386 A1 | 10/2010 |
| WO | 2014053824 A1 | 4/2014 |
| WO | 2015131135 A1 | 9/2015 |
| WO | 2015171793 A1 | 11/2015 |
| WO | 2016033590 A1 | 3/2016 |
| WO | 2017062673 A1 | 4/2017 |
| WO | 2017196306 A1 | 11/2017 |
| WO | 2017205857 A1 | 11/2017 |
| WO | 2020074532 A1 | 4/2020 |
| WO | 2020180729 A1 | 9/2020 |

(56) References Cited

FOREIGN PATENT DOCUMENTS

| | | |
|---|---|---|
| WO | 2020215359 A1 | 10/2020 |
| WO | 2020216763 A1 | 10/2020 |
| WO | 2020257711 A1 | 12/2020 |
| WO | 2021023799 A1 | 2/2021 |
| WO | 2021049243 A1 | 3/2021 |
| WO | 2021066047 A1 | 4/2021 |
| WO | 2021092211 A1 | 5/2021 |
| WO | 2021183637 A1 | 9/2021 |
| WO | 2022149028 A1 | 7/2022 |
| WO | 2023089416 A1 | 5/2023 |
| WO | 2023089459 A1 | 5/2023 |
| WO | 2023097391 A1 | 6/2023 |

OTHER PUBLICATIONS

Chi-Hung Lee et al. Imaging vitreous floaters and cataracts with optical simulations, Optik, vol. 194, 2019, 163075, ISSN 0030-4026. (Year: 2019).*

Jihwan Kim, et al., Nonmechanical Laser Beam Steering Based on Polymer Polarization Gratings: Design Optimization and Demonstration, Journal of Lightwave Technology, May 15, 2015, 2068-2077, 33-10, IEEE.

Michael J. Escuti, et al., Geometric-Phase Holograms, Optics & Photonics News, Feb. 22-29, 2016, 1047-6938/16/02/22/8.

Blake F. Webb, et al.; "Prevalence of vitreous floaters in a community sample of smartphone users"; Internat'l Journal of Ophthalmology; Jun. 18, 2013; pp. 402-405; 6(3); PMC/ US National Library of Medicine National Institutes of Health.

Chirag P. Shah, et al., YAG Laser Vitreolysis vs Sham YAG Vitreolysis for Symptomatic Vitreous Floaters A Randomized Clinical Trial, JAMA Ophthalmology, Sep. 2017, 918-923, 135-9.

Damodaran et al., "Digital micromirror device based ophthalmoscope with concentric circle scanning", 2017, pp. 2766-2780, vol. 8, No. 5, Biomedical Optics Express.

ELLEX Website, Treatment Guidelines—Laser Floater Removal; 2016, Ellex Medical Pty Ltd. E&OE. VB0002E, downloaded Apr. 20, 2017.

Felix Sauvage et al: "Photoablation of Human Vitreous Opacities by Light—Induced Vapor Nanobubbles", ACS Nano, vol. 13, No. 7, Jul. 9, 2019, pp. 8401-8416.

Fischer et al., "Scanning Laser Ophthalmoscopy (SLO)", In: Bille JF, editor. High Resolution Imaging in Microscopy and Ophthalmology: New Frontiers in Biomedical Optics [Internet], Aug. 14, 2019, accessed on Jan. 30, 2023 from https://www.ncbi.nlm.nih.gov/books/NBK554043, Springer.

Ginner et al., "Wide-Field OCT Angiography at 400 KHz Utilizing Spectral Splitting", Photonics, Oct. 23, 2014, pp. 369-379, vol. 1, No. 4.

Heidelberg Engineering Gmbh, "Spectralis. Hardware Operating Instructions," Version 001, Aug. 2007.

Heidelberg Engineering, "Spectralis. Multimodal Imaging Platform Optimized for the Posterior Segment", accessed on Jan. 30, 2023 from https://business-lounge.heidelbergengineering.com/us/en/products/spectralis/spectralis/.

Hofer et al., "Dispersion encoded full range frequency domain optical coherence tomography", Jan. 5, 2009, pp. 7-24, vol. 17, No. 1, Optics Express, US.

Hofer et al., "Fast dispersion encoded full range optical coherence tomography for retinal imaging at 800 nm and 1060 nm", Mar. 1, 2010, pp. 4898-4919, vol. 18, No. 5, Optics Express.

Leitgeb et al., "Complex ambiguity-free Fourier domain optical coherence tomography through transverse scanning", 2007, pp. 3453-3455, vol. 32, Optics Letters.

Li et al., "DMD-based three-dimensional chromatic confocal microscopy", 2020, pp. 4349-4356, vol. 59, No. 14, Applied Optics.

Martial et al., "Programmable Illumination and High-Speed, Multi-Wavelength, Confocal Microscopy Using a Digital Micromirror", Aug. 2012, e43942, vol. 7, No. 8, Plos One.

Milston Rebecca et al: "Vitreous floaters: Etiology, diagnostics, and management", Survey of Ophthalmology, vol. 61, No. 2, Mar. 1, 2016, pp. 211-227.

Nicusor Iftimia et al: "Hybrid retinal imaginer using line-scanning laser ophthalmoscopy and spectral domain optical coherence tomography", Optics Express, vol. 14, No. 26, Dec. 22, 2006.

Reece Bergstrom, et al., Vitreous Floaters, National Center for Biotechnology Information, May 21, 2020, 4 pages, Bookshelf ID NBK470420, StatPearls Publishing LLC, online.

Reznicek Lukas et al., "Wide-Field Megahertz OCT Imaging of Patients with Diabetic Retinopathy", Journal of Diabetes Research, 2015, 5 pages.

Ruggeri et al., "Imaging and full-length biometry of the eye during accommodation using spectral domain OCT with an optical switch", Jul. 1, 2012, pp. 1506-1520, vol. 3, No. 7, Biomedical Optics Express.

Sarunic et al., "Instantaneous complex conjugate resolved spectral domain and swept-source OCT using 3×3 fiber couplers", Feb. 2005, pp. 957-967, vol. 13, No. 3, Optics Express.

Singh, "Lasers Take Aim At Floaters", Ophthalmology Management, Jul. 1, 2019, pp. 38, 40-42, 59, vol. 23.

Singh, "Modern vitreolysis—YAG laser treatment now a real solution for the treatment of symptomatic floaters", Survey of Ophthalmology, Mar. 3, 2020, pp. 581-591, vol. 65, No. 5.

Wang et al., "In vivo full range complex Fourier domain optical coherence tomography", Jan. 30, 2007, 054103, vol. 90, Applied Physics Letters.

Wikipedia Encyclopedia, Floater, Wikipedia Encyclopedia, Mar. 29, 2021, online: https://en.wikipedia.org/wiki/rloater?wprov=sfti 1.

Wojtkowski et al., "Full range complex spectral optical coherence tomography technique in eye imaging", 2002, pp. 1415-1417, vol. 27, No. 16, Optics Letters.

Yasuno et al., "Simultaneous B—M-mode scanning method for real-time full-range Fourier domain optical coherence tomography", 2006, pp. 1861-1865, vol. 45, No. 8, Applied Optics.

Zhang et al., Removal of a mirror image and enhancement of the signal-to-noise ratio in Fourier-domain optical coherence tomography using an electro-optic phase modulator, Jan. 15, 2005, vol. 30, No. 2, Optics Letters.

Zhang Yunbo et al: "Parallel large-range scanning confocal microscope based on a digital micromirror device", Optik vol. 124, No. 13 (2013), Aug. 4, 2012, pp. 1585-1588.

Zhou et al., "Dual channel dual focus optical coherence tomography for imaging accommodation of the eye", May 25, 2009, pp. 8947-8955, vol. 17, No. 11, Optics Express.

Carol L. Shields et al, "Wide-angle Imaging Of the Ocular Fundus", Review of Ophthalmology, published Feb. 15, 2003.

SunLED, NanoPoint-0201 Series LEDs, published Feb. 15, 2016.

Volk Idrees Mid-Vitreous-Volk Optical, Dec. 20, 2020, https://www.volk.com/ . . . s?pr_prod_strat=collection_fallback&pr_rec_pid=4513049018402&pr_ref_pid=4513048952866&pr_seq=uniform [Dec. 20, 2020 11:05:28 AM].

Volk Singh Mid-Vitreous Lens-Volk Optical, Dec. 20, 2020, https://www.volk.com/products/singh-mid-vitreous-vitreous-slit-lamp-lens?_pos=3&_sid=b50c0674f&_ss=r[Dec. 20, 2020 11:04:54 AM].

Adrian G.H. Podoleanu et al., Combined optical coherence tomograph and scanning laser ophthalmoscope mi nije dostupan besplatno., Electronics Letters, 34 (11), 1998.

Christy K. Sheehy et al., High-speed, image-based eye tracking with a scanning laser ophthalmoscope, Biomedical Optics Express, vol. 3, No. 10, 2012.

D. H. Kelly, "Retinal Inhomogeneity. II. Spatial Summation," J. Opt. Soc. Am., pp. 114-119, vol. 1, No. 1 (Jan. 1984).

D. H. Kelly, "Retinal Inhomogeneity. III. Circular-Retina Theory," D.H. Kelly, J. Opt. Soc. Am., pp. 810-819, vol. 2, No. 6 (Jun. 1985).

D.H. Kelly, "Visual Processing of Moving Stimuli," J. Opt. Soc. Am., pp. 216-225, vol. 2, No. 2 (Feb. 1985).

D.H. Kelly,, "Motion and Vision. II. Stabilized Spatio-Temporal Threshold Surface," J. Opt. Soc. Am., pp. 1340-1349, vol. 69, No. 10 (Oct. 1979).

D.H.Kelly, "Retinal Inhomogeneity. I. Spatiotemporal Contrast Sensitivity," J. Opt. Sec. Am., pp. 107-113, vol. 1, No. 1 (Jan. 1984).

(56) References Cited

OTHER PUBLICATIONS

Nidek, Scanning Laser Ophthalmoscope Mirante SLO/OCT Mirante SLO, https://www.nidek-intl.com/product/ophthaloptom/diagnostic/dia_retina/mirante.htm.

Peter G. J. Barten, "Contrast Sensitivity of the Human Eye and its Effects on Image Quality," Chapter 3, pp. 27-40, Model for the spatial contrast sensitivity of the eye, (1999).

Pointer, J. S., & Hess, R. F. "The contrast sensitivity gradient across the human visual field: With emphasis on the low spatial frequency range,", R. F. Vision Research, 29(9), 1133-1151 (1989).

Sebag J et al., Vitreous and Vitreoretinal Interface, Ch. 21, 2015.

Sebag J., Vitreous and Vision Degrading Myodesopsia. Progress in Retinal and Eye Research Nov. 2020;79.

T Ivanova et al., Vitrectomy for primary symptomatic vitreous opacities: an evidence-based review, Eye (Lond) May 2016;30(5):645-55.

Teri T Kleinberg et al., Vitreous substitutes: a comprehensive review, Survey of Ophthalmology, 56 (4), 2011.

\* cited by examiner

# VISUALIZATION AND TREATMENT OF MEDIA OPACITY IN EYE

CROSS-REFERENCE TO RELATED APPLICATIONS

This application claims the benefit of priority of U.S. patent application Ser. No. 63/076,942, filed Sep. 11, 2020, and claims the benefit of priority of U.S. patent application Ser. No. 63/059,399, filed Jul. 31, 2020, the entire contents of which are incorporated by reference herein in its entirety.

TECHNICAL FIELD

The disclosure relates generally to visualization and treatment of one or more media opacities in an eye.

BACKGROUND

Humans have five basic senses: sight, hearing, smell, taste, and touch. Sight gives us the ability to visualize the world around us and connects us to our surroundings. Many people worldwide have issues with their quality of vision. One condition affecting vision quality is the presence of media opacities, sometimes referred to as floaters, in the vitreous humor of the eye. Media opacities may appear as spots or shadows of various shapes that appear to float in the field of vision of the patient, and scatter light entering the eye. The origin of the media opacities may be microscopic collagen fibers within the vitreous humor. Treatment of the media opacity may include vitrectomy or laser vitreolysis. Because the vitreous cavity and the retina are deeper than anterior tissues such as the cornea and the lens, effective visualization and delivery of treatment for media opacities is often challenging.

SUMMARY

Disclosed herein is a system for treating a media opacity in a vitreous media of an eye. The system includes a visualization module adapted to provide visualization data of a portion of the eye, via one or more viewing beams. The system includes a laser module adapted to selectively generate a treatment beam directed towards the media opacity in order to incise, vaporize or otherwise disrupt the media opacity. The laser module and the visualization module have a shared aperture for guiding the treatment beam and the one or more viewing beams towards the eye, the shared aperture being centered about a central axis.

A controller is in communication with the visualization module and the laser module, the controller having a processor and a tangible, non-transitory memory on which instructions are recorded. Execution of the instructions by the processor causes the controller to acquire one or more defining parameters of the media opacity based at least partially on the visualization data, the one or more defining parameters including a shape and a size of the media opacity. The controller is configured to determine when a threshold portion of the media opacity is within a predefined target zone of the real-time viewing window based at least partially on the one or more defining parameters. In some embodiments, the defining parameters include a depth of the media opacity. The treatment beam is directed towards the media opacity when the threshold portion of the media opacity is with the predefined target zone.

In some embodiments, a sensor is in communication with the controller and configured to detect motion of a patient. The controller is configured to disable the treatment beam when motion of the patient is detected by the sensor. The controller may configured to obtain a speckle pattern of scattered light originating from the treatment beam, the scattered light being sized at about a wavelength of the treatment beam. In some embodiments, the system may include a joystick unit in communication with the controller and configured to enable depth selection of the visualization module.

The treatment beam may include a plurality of ultra-short laser pulses. The plurality of ultra-short laser pulses may define a respective time duration of between about a femtosecond and about 50 picoseconds. The treatment beam may travel in a direction parallel to the central axis. In some embodiments, the treatment beam may travel at an off-axis angle from the central axis, the off-axis angle being at or above 25 degrees.

In some embodiments, a corneal interfacing member may be positioned in close proximity to a cornea of the eye, the corneal interfacing member being configured to decrease a depth of field for the treatment beam. The visualization module may be configured to employ electromagnetic radiation reflected from one or more optical devices prior to striking the eye, the one or more optical devices being positioned such that only oblique rays strike the eye and central rays are blocked.

In some embodiments, the visualization module includes a light source, a mirror unit, a first polarizer and a second polarizer, the second polarizer being oriented at 90 degrees with respect to the first polarizer. The first polarizer is adapted to polarize at least one incident beam from the light source to produce a linearly polarized light wave. The mirror unit is adapted to direct the linearly polarized light wave onto the eye. The second polarizer is positioned such that a reflected beam exiting the eye is projected onto the second polarizer. The visualization module may further include a birefringent prism configured to intercept the linearly polarized light wave prior to the linearly polarized light wave striking the eye. The birefringent prism is configured to intercept the reflected beam prior to the reflected beam being projected onto the second polarizer.

In some embodiments, the visualization module includes an electronically controlled liquid lens having a response time of between 1 and 5 milliseconds. The system may include a wavefront sensor configured to determine ocular aberrations in the one or more viewing beams exiting the eye. A deformable mirror configured to shape a wavefront of the treatment beam based in part on the ocular aberrations determined by the wavefront sensor. The system may include a spatial light modulator adapted for shaping at least one of a respective phase and a respective amplitude of the one or more viewing beams. The spatial light modulator may be located coaxial to the central axis. The spatial light modulator may be rotatable off-axis relative to the central axis.

Disclosed herein is a method for treating a media opacity in an eye with a system having a visualization module, a laser module and a controller with a processor and a tangible, non-transitory memory on which instructions are recorded. The method includes adapting the laser module to selectively generate a treatment beam directed towards the media opacity and obtaining visualization data of the eye, via the visualization module. The method includes acquiring and storing one or more defining parameters of the media opacity based at least partially on the visualization data. The defining parameters including a shape and a size of the media opacity. The method further includes determining when a threshold portion of the media opacity is within a predefined target zone based at least partially on the one or more defining parameters, via the controller. The treatment beam is directed towards the media opacity when the threshold portion of the media opacity is within the predefined target zone, via the laser module, in order to disrupt the media opacity.

The above features and advantages and other features and advantages of the present disclosure are readily apparent from the following detailed description of the best modes for carrying out the disclosure when taken in connection with the accompanying drawings.

DETAILED DESCRIPTION

Figure 1:
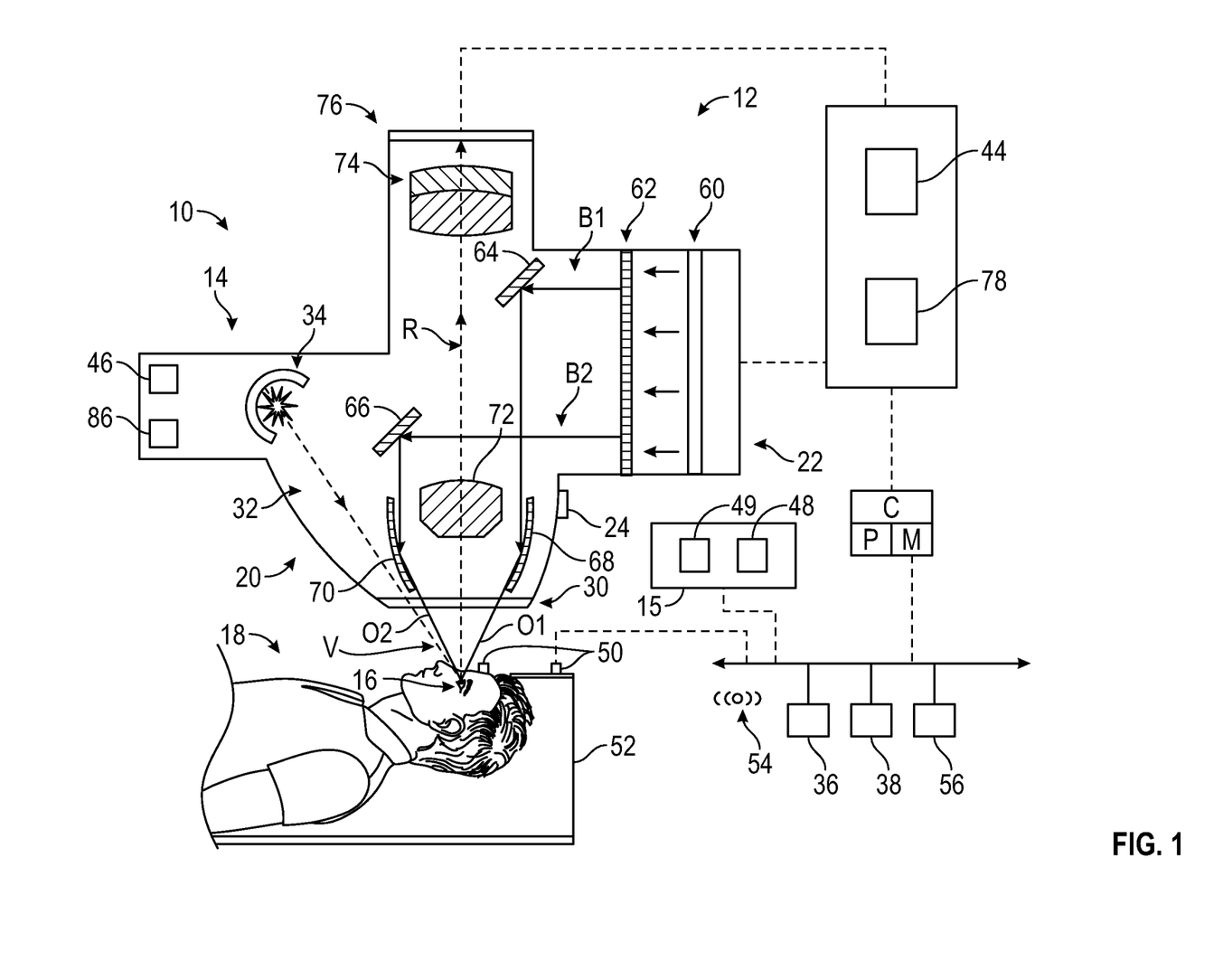
FIG. 1 is a schematic illustration of a system for treating a media opacity in an eye, the system having a controller, a visualization module and a laser module.

Referring to the drawings, wherein like reference numbers refer to like components, FIG. 1 schematically illustrates a system 10 having a visualization module 12, a laser module 14 and a surgical camera 15. As described below, the visualization module 12 is a stereo optical visualization system. The system 10 is configured to image and treat a target site. In the embodiment shown, the target site is an eye 16 of a patient 18. Referring to FIG. 1, the visualization module 12 and laser module 14 are at least partially located in a head unit 20 of a housing assembly 22, with the head unit 20 configured to be at least partially directed towards the eye 16. The head unit 20 may be set up to accommodate various positions of the patient 18. For example, the patient 18 may be in an upright sitting position during an eye procedure. Referring to FIG. 1, a selector 24 may be mounted on the head unit 20 for selecting specific features, such as magnification or zoom, focus and other features.

Figure 2:
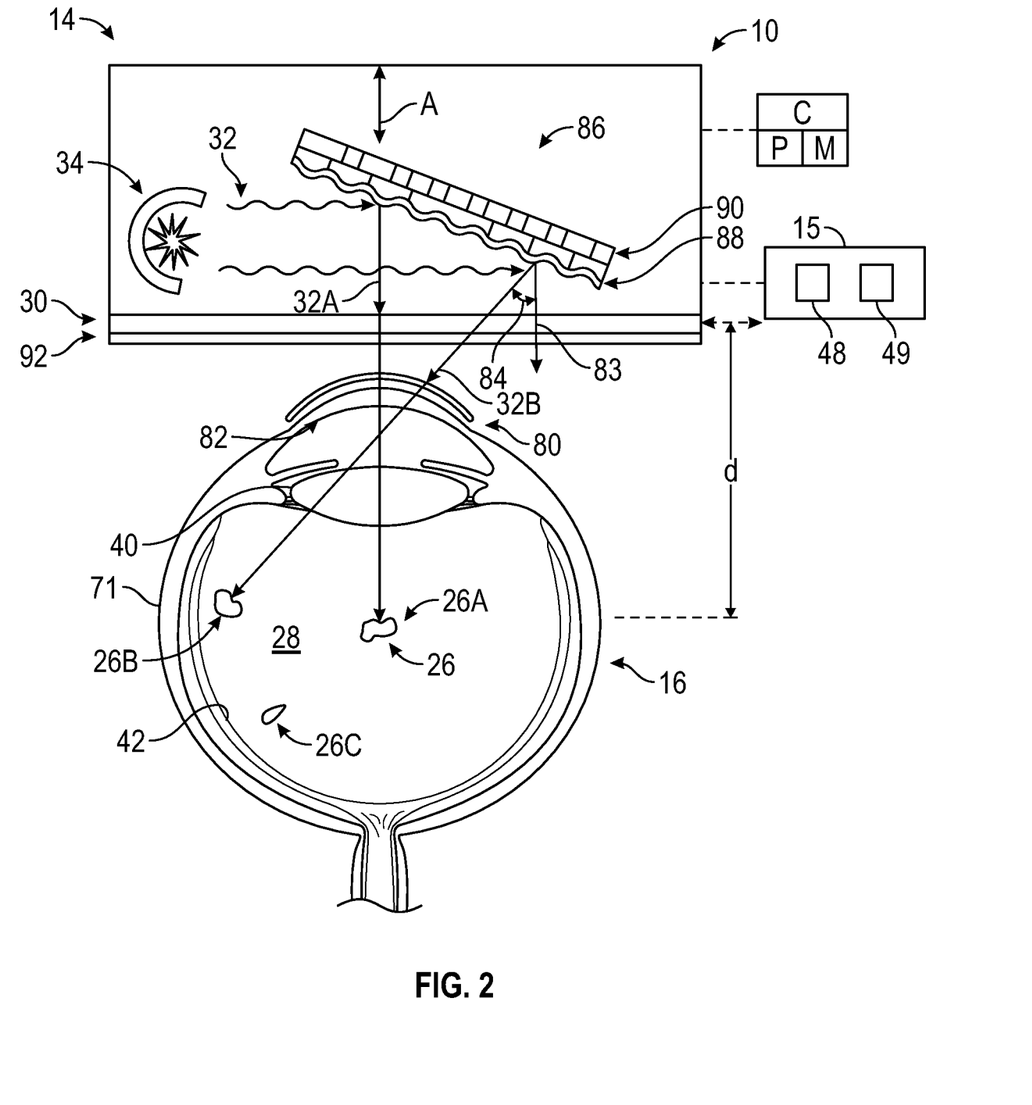
FIG. 2 is a schematic illustration of a portion of the system of FIG. 1.

Referring now to FIG. 2, a schematic view of a portion of system 10 is shown. The system 10 is configured to treat at least one media opacity 26 in the eye 16, as shown in FIG. 2. The media opacity 26 may be located at various positions in the vitreous media 28, as indicated by first media opacity 26A, second media opacity 26B and third media opacity 26C (see FIG. 2). As described below, the system 10 leverages both visualization data and beam delivery parameters for optimizing treatment of the media opacity 26. The system 10 incorporates a shared aperture 30 for simultaneous visualization, imaging and delivering treatment to the media opacity 26.

Referring to FIG. 2, the laser module 14 is configured to selectively generate at least one treatment beam 32 directed towards the media opacity 26, via a laser source 34. In some embodiments, the treatment beam 32 includes a plurality of ultra-short laser pulses, each having a time duration of between about a femtosecond ($10^{15}$ seconds) and about 50 picoseconds ($50 \times 10^{12}$ seconds). The treatment beam 32 is optimized in order to at least partially incise, vaporize, disrupt, disintegrate or otherwise reduce the media opacity 26.

Referring to FIGS. 1 and 2, the system 10 includes a controller C having at least one processor P and at least one memory M (or non-transitory, tangible computer readable storage medium) on which instructions may be recorded for executing a method 300, shown in and described below with respect to FIG. 5. The memory M can store controller-executable instruction sets, and the processor P can execute the controller-executable instruction sets stored in the memory M.

The visualization module 12 guides the surgeon in making the diagnosis, selecting the target site, and guiding the laser vitreolysis energy. The visualization module 12 is adapted to obtain visualization data of the eye 16. As described below, the visualization module 12 may employ various techniques to generate contrast, including digitally programmable epi-illumination microscopy using a spatial light modulator 200, shown in FIG. 4. Referring to FIG. 1, the controller C may be configured to process signals from the visualization module 12 for broadcasting on a display 36. The display 36 may include, but is not limited to, a high-definition television, an ultra-high definition television, smart-eyewear, projectors, one or more computer screens, laptop computers, tablet computers and may include a touchscreen.

Referring to FIG. 1, the controller C may be configured to process signals to and from a user interface 38 operable by a surgeon or other member of the surgical team. In one example, the user interface 38 is a joystick unit 38. In one embodiment, the visualization module 12 is a stereo optical microscope having depth selection controllable via the joystick unit 38. Precise depth control serves to protect the lens 40 and retina 42 of the eye, shown in FIG. 2.

The visualization module 12 and the laser module 14 may include integrated processors or device controllers in communication with the controller C. For example, referring to FIG. 1, the visualization module 12 may include a module processor 44 and the laser module 14 may include a laser processor 46. The module processor 44 and laser processor 46 may be separate modules in communication with the controller C. Alternatively, the module processor 44 and laser processor 46 may be embedded in the controller C.

The surgical camera 15 may be communicatively coupled to controller C and other components of the system 10, such as the display 36. The surgical camera 15 may include an integrated control unit 48 having a processor, memory and image processing unit. Referring to FIG. 1, a visible light illumination source 49 may be employed as an illumination source for the surgical camera 15. The visible light illumination source 49 may include a xenon source, a white LED light source, or any other suitable visible light source. The surgical camera 15 may include one or more sensors configured to detect light reflected off eye 16 and send a signal corresponding to the detected light to the controller C or integrated control unit 48. The sensors may be complementary metal-oxide semiconductor (CMOS) sensors, charge-coupled device (CCD) sensors or other sensors available to those skilled in the art. The digital image of eye 16 may be shown on display 36. The surgical camera 15 may be a digital camera, an HDR camera, a 3D camera, or a combination thereof. The surgical camera 15 may be a monochrome camera or a color camera. The surgical camera 15 may utilize respective assemblies (not shown) available to those skilled in the art for optomechanical focus, changing zoom and varying the working distance of the surgical camera 15.

Referring to FIG. 1, the system 10 may include a motion sensor 50 in communication with the controller C and configured to detect motion of the patient 18. In one example, the motion sensor 50 is in contact with a structural member 52 supporting the patient 18, such as a headrest. In another example, the motion sensor 50 is in contact with the forehead of the patient 18. The controller C may be configured to disable the treatment beam 32 when motion of the patient 18 is detected by the sensor 50.

The various components of the system 10 may be configured to communicate via a network 54, shown in FIG. 1. The network 54 may be a bi-directional bus implemented in various ways, such as for example, a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. Other types of connections may be employed. The system 10 may further include a communications interface 56 for transmitting and receiving information from a remote server and/or cloud unit.

The visualization module 12 is adapted to provide visualization data of the eye 16 via one or more viewing beams V (see FIG. 1). As described below, the visualization module 12 is configured to employ electromagnetic radiation reflecting off one or more optical devices, prior to striking the eye 16. While an example embodiment of the visualization module 12 is shown in FIG. 1, it is to be understood that the visualization module 12 may include other types of imaging devices available to those skilled in the art. Referring to FIG. 1, the visualization module 12 includes a light source 60 emitting light in the visible range of the electromagnetic spectrum. As shown in FIG. 1, first viewing beam B1 and second viewing beam B2 originate from the light source 60 and may pass through a collimation unit 62. The collimation unit 62 may include various field and aperture diaphragms and other optical devices available to those skilled in the art.

The first viewing beam B1 and second viewing beam B2 are directed towards the eye 16 via a first reflecting device 64 and a second reflecting device 66, respectively. The first reflecting device 64 and the second reflecting device 66 may be placed at a selected distance and configured to selectively reflect light of a specific desired wavelength. The first reflecting device 64 and the second reflecting device 66 may be a mirror, a corner cube or a spatial light modulator 200, described below. The reflected light from the first reflecting device 64 and a second reflecting device 66 travel towards a first curved mirror 68 and a second curved mirror 70, respectively. Referring to FIG. 1, the first curved mirror 68 and the second curved mirror 70 direct the first viewing beam B1 and the second viewing beam B2 at an oblique incident angle onto a portion of the eye 16, as first oblique ray O1 and second oblique ray O2, respectively. In the embodiment shown in FIG. 1, the central light which ordinarily passes through and around the target site is blocked and only oblique rays from every azimuth is able to strike the target site, which is the eye 16. This annular illumination removes the zeroth order or un-scattered light, resulting in an image formed from the higher order diffraction intensities scattered by the eye 16. Accordingly, the portion of the eye 16 being imaged is seen as bright in contrast to a dark background.

Referring to FIG. 1, the first oblique ray O1 and second oblique ray O2 may be comprised of respective hollow cones of light. The first oblique ray O1 and second oblique ray O2 strike the eye 16. Vitreous visualization is similar to reflectance microscopy (epi-illumination) in that the light source and imaging/visualization optics are on the same side of the target site. However, vitreous visualization/imaging is different in that the source of the visualization data is light reflected from the retina 42 and/or sclera 71 passing through the phase objects, such as the media opacity 26, in the vitreous media 28. In essence the light source is behind the target site. Referring to FIG. 1, the reflected beam R (from the retina 42 and/or sclera 71) is diffracted, reflected, and/or refracted by the media opacity 26 (see FIG. 2) in the vitreous media 28. The reflected beam R travels back through an objective lens 72 and a tube lens 74.

Referring to FIG. 1, at least one of the objective lens 72 and the tube lens 74 may be an electronically controlled liquid lens. In some embodiments, the electronically controlled liquid lens may include a core containing optical fluid that is sealed with a flexible outer membrane. The focal length of the electronically controlled liquid lens may be altered by changing the curvature of the flexible outer membrane fluid, for example via a current-controlled voice coil. In one example, the electronically controlled liquid lens has a 1 millisecond response time.

The reflected beam R encodes the location of multiple reflection points in the eye 16, relative to some known reference point or relative to each other. Referring to FIG. 1, the encoding may be captured by a detector 76 and processed via the module processor 44 and/or the controller C. In one example, the detector 76 includes a photoreceptor coupled to an electrical device. However, it is understood that the detector 76 may include other types of receptor devices available to those skilled in the art. In some embodiments, fiber optics may be employed to transport and/or guide the first viewing beam B1 and second viewing beam B2 and direct it to fall onto an appropriate region of interest in the eye 16. Other methods available to those skilled may be employed to transport and/or guide the various beams within the system 10. Additionally, the system 10 may include optical viewing as well as electronic visualization.

Referring to FIG. 1, the visualization module 12 may include a steering unit 78 for steering the first viewing beam B1 and/or the second viewing beam B2. In one embodiment, the steering unit 78 includes a multi-axis galvanometer or a single-axis galvanometers. A single-axis galvanometer is a small lightweight mirror that can rock back and forth on an axis under electrical control, thereby modifying the reflection direction of the path of light reflected along one axis.

Figure 4:
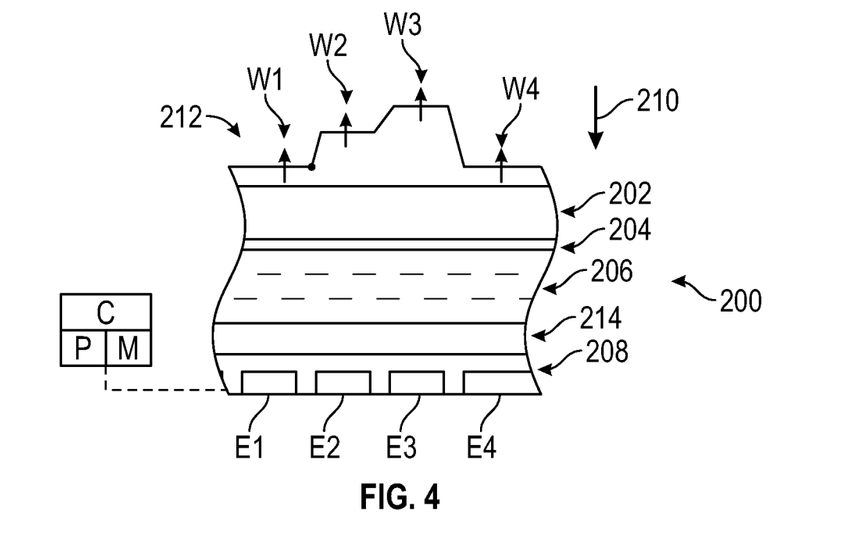
FIG. 4 is a schematic fragmentary diagram of an example spatial light modulator that may be employed by the system of FIG. 1.

The first reflecting device 64 and the second reflecting device 66 may include a spatial light modulator 200, an example of which is shown in FIG. 4. Referring to FIG. 4, the spatial light modulator 200 may include a cover layer 202 adjacent to a zero-voltage electrode layer 204. The cover layer 202 may be composed of silicone, glass or other suitable material. A liquid crystal modulator 206 is located between the zero-voltage electrode layer 204 and an array of pixel electrodes 208, which include first through fourth pixel electrodes E1, E2, E3 and E4.

The spatial light modulator 200 is adapted to shape at least one of a respective phase and a respective amplitude of the incident light 210 on a pixel-by-pixel basis. Referring to FIG. 4, each of the array of pixel electrodes 208 may be configured to apply a different potential difference relative to the zero-voltage electrode layer 204. The potential difference of the pixel electrodes 208 may be selected, directly or indirectly, by the controller C. Accordingly, the reflected light 212 (which includes first wavefront portion W1, second wavefront portion W2 third wavefront portion W3 and fourth wavefront portion W4) may be fashioned with variable amplitude and/or phase in the spatial dimension. The spatial light modulator 200 may include phase-only, amplitude-only, or combined phase and amplitude modulation modes. In the example shown, the highest potential difference is applied by the third pixel electrode E3. In order to reduce diffraction losses, a dielectric mirror 214 may be positioned between the liquid crystal modulator 206 and the array of pixel electrodes 208.

Better visualization of the media opacity 26 is crucial to precise and effective laser vitreolysis. The spatial light modulator 200 provides a programmable phase and/or amplitude shift at each pixel, enabling the production of a custom-designed wavefront entering the eye 16. By selectively controlling the phase and/or amplitude of light spatially, the border or edges of the media opacity 26 relative to the surrounding vitreous media 28 may be more accurately discerned and visualized. Consequently, the spatial light modulator 200 results in an overall improvement of the treatment of the patient 18. The spatial light modulator 200 may be oblique or coaxial to central axis A. The spatial light modulator 200 may be located in the illumination and/or view pathway. The system 10 may employ various other optical mechanisms and optical devices to translate minute variations in local phase (e.g. due to optical path length differences and/or local index of refraction) into corresponding changes in brightness, which may be visualized as differences in image contrast.

Figure 3:
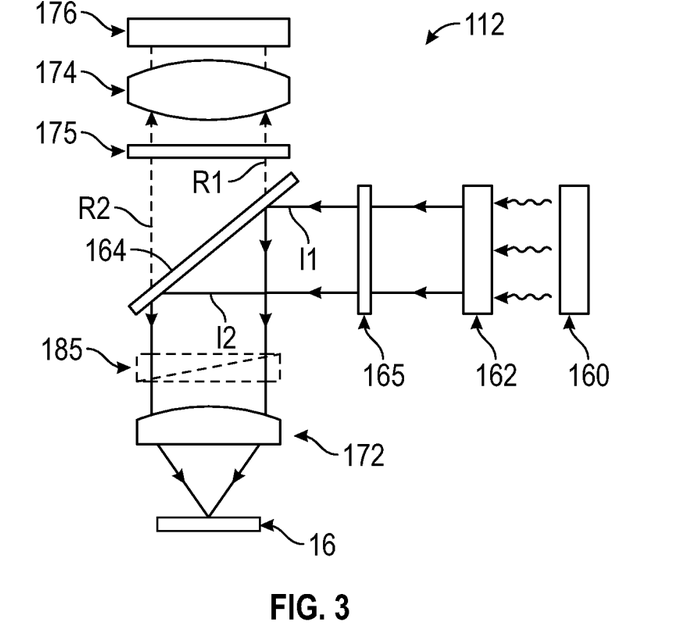
FIG. 3 is a schematic fragmentary diagram of a visualization module that may be employed by the system of FIG. 1, in accordance with another embodiment.

In accordance with an alternate embodiment, a visualization module 112 is shown in FIG. 3. The visualization module 112 includes polarization devices, such as a first polarizer 165 and a second polarizer 175. Referring to FIG. 3, the first incident beam I1 and the second incident beam I2 originate from a light source 160 and may pass through a collimation unit 162. The first incident beam I1 and the second incident beam I2 may be polarized by a first polarizer 165 before the mirror unit 164 directs them into the objective lens 172. The linearly polarized light waves are focused onto the eye 16 and reflected back into the objective lens 172. On the return path from the eye 16, the first reflected beam R1 and the second reflected beam R2 encounter a second polarizer 175 that is oriented at 90 degrees with respect to the first polarizer 165. Only the depolarized wavefronts are able to pass through the second polarizer 175 to reach the tube lens 174 and the detector 176, improving contrast.

Optionally, referring to FIG. 3, the visualization module 112 may include a birefringent prism 185 (shown in phantom), in addition to the first polarizer 165 and the second polarizer 175. The birefringent prism 185 is placed above the objective lens 172 and configured to create a lateral displacement in the regions the eye 16 where surface relief exists. The birefringent prism 185 splits the polarized light wavefronts (which have passed through the first polarizer 165) into two orthogonal polarized beams on their way to the eye 16. This allows the visualization of minute elevation differences in surfaces. If the profile struck by the first incident beam I1 or second incident beam I2 is completely flat, no features are observed. If the profile includes surface variations, one of the first incident beam I1 or the second incident beam I2 must travel a path that is longer and is assigned this path difference.

Referring to FIG. 3, on the return path after passing through the objective lens 172 and birefringent prism 185, the first reflected beam R1 and the second reflected beam R2 pass through the second polarizer 175 (prior to encountering the tube lens 174 and detector 176) where interference produces an intermediate image. The detector 176 may include photoreceptors and other electronic components to translate the path differences into contrast discernable on an image. The visualization module 112 may include additional components, accessories and circuitry not shown.

Figure 8:
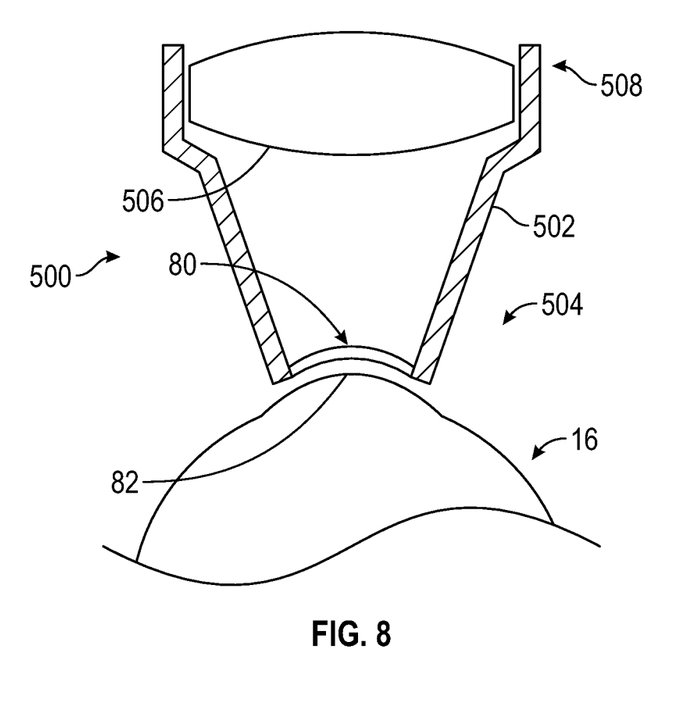
FIG. 8 is a schematic fragmentary diagram of a corneal interfacing member that may be employed by the system of FIG. 1.

Referring now to FIG. 2, a corneal interfacing member 80 may be positioned in close proximity to the eye 16. The corneal interfacing member 80 is adapted to eliminate corneal asphericity, which may occur due to prior corneal surgery in the patient 18. By decreasing the depth of field for laser delivery, the corneal interfacing member 80 makes the treatment beam 32 highly convergent and enables high spatial coherence. The corneal interfacing member 80 may be in the form of a plano contact lens worn directly over the cornea 82 of the eye 16. The corneal interfacing member 80 may be in the form of a plano contact lens supported by a delivery unit 500, an example of which is shown in FIG. 8. Referring to FIG. 8, the delivery unit 500 may include a hollow frame 502 supporting the corneal interfacing member 80 at a first end 504. A lens 506 may be positioned at the opposing end 508 of the delivery unit 500. In some embodiments, a surface treatment of high viscosity thixotropic contact fluid is applied on the corneal interfacing member 80 to increase friction. The corneal interfacing member 80 may be configured to decrease saccadic velocity by combining high viscosity thixotropic contact fluid and a large surface area with minimal contact force.

Referring to FIGS. 1-2, the laser source 34 may be a femtosecond laser or a picosecond laser and may emit light with a wavelength of about 1,050 nm. A non-limiting example of a laser setting is 10 milli-joules. In one example, the laser source 34 is configured to deliver infrared radiation, a wavelength of between about 700 to 1220 nm. The laser module 14 is configured to precisely target a plurality of ultra-short laser pulses in the treatment beam 32 towards the media opacity 26. In one embodiment, the laser source 34 is constructed in a master oscillator power amplifier (MOPA) configuration, with an ytterbium-doped single mode fiber laser passively mode-locked by a semiconductor saturable absorber mirror (SESAM). The laser source 34 may be constructed with femtosecond fiber lasers, which have a technical advantage from a cost, size, ruggedness, and stability perspective. In one embodiment, the laser module 14 may include a MOPA architecture using photonics crystal fibers and SESAM. Fiber-based femtosecond lasers using MOPA have KHz-MHz rep rates that enable continuous operation by the surgeon instead of infrequent brief pulses (as provided by YAG lasers).

Referring to FIG. 2, the direction of the treatment beam 32 may be varied based on the application at hand. For example, a first treatment beam 32A may travel in a direction parallel to a central axis A defined by the shared aperture 30. Referring to FIG. 2, the shared aperture 30 is centered about and perpendicular to the central axis A. Referring to FIG. 2, a second treatment beam 32B is directed in an off-axis direction, at an off-axis angle 84 between treatment beam 32B and a reference line 83. The reference line 83 is parallel to the central axis A. In some embodiments, the off-axis angle 84 is at or above 25 degrees. The off-axis angle 84 may be at or above 45 degrees. In some embodiments, the laser module 14 may be rotatable relative to the central axis A. While the laser source 34 of the laser module 14 is shown in the example in FIG. 1 as being non-coaxial to the light source 60 of the visualization module 12, it is understood that the location of the laser source 34 relative to the light source 60 may be varied. For example, the position and orientation of the laser source 34 may be changed to be co-axial to the light source 60.

Referring to FIG. 2, the treatment beam 32 may interact with a modulating device 86 for various beam modification purposes. For example, the modulating device 86 may be configured to modulate the phase of the treatment beam 32 emitted by the laser source 34. The modulating device 86 may be configured to distribute the energy of the treatment beam 32 to generate multiple impact points in its focal plane. The modulating device 86 may be located coaxial to the central axis A. In some embodiments, the modulating device 86 is rotatable off-axis relative to the central axis A.

In some embodiments, the modulating device 86 is a deformable mirror 88, shown in FIG. 2. The surface of the deformable mirror 88 may be deformed or bent through an array of actuators 90 in order to achieve correction of optical aberrations.

The deformable mirror 88 may be employed in combination with a wavefront sensor 92 (see FIG. 2). This approach is advantageous in reducing defocus and aberrations in patients having multifocal and extended depth of focus intraocular lenses. The wavefront sensor 92 is configured to determine ocular aberrations in the reflected beam R (see FIG. 1) exiting the eye 16. In one example, the wavefront sensor 92 is a Shack-Hartmann wavefront sensor having an array of lenslets coupled to an integrated detector. The array of lenslets cause spots to be focused onto the detector, and the positions of these spots may be calculated and compared with the positions of reference spots from a reference beam. The first viewing beam B1 and the second viewing beam B2 (see FIG. 1) may be used as reference beams for the wavefront sensor 92. The controller C is configured to obtain local phase errors in the wavefront of the reflected beam R, via the wavefront sensor 92, and use the phase errors to numerically reconstruct the wavefront, which can then be used to correct the local phase errors via the modulating device 86. The controller C may correct the wavefront errors via an open loop or closed loop correction, as understood by those skilled in the art.

Figure 5:
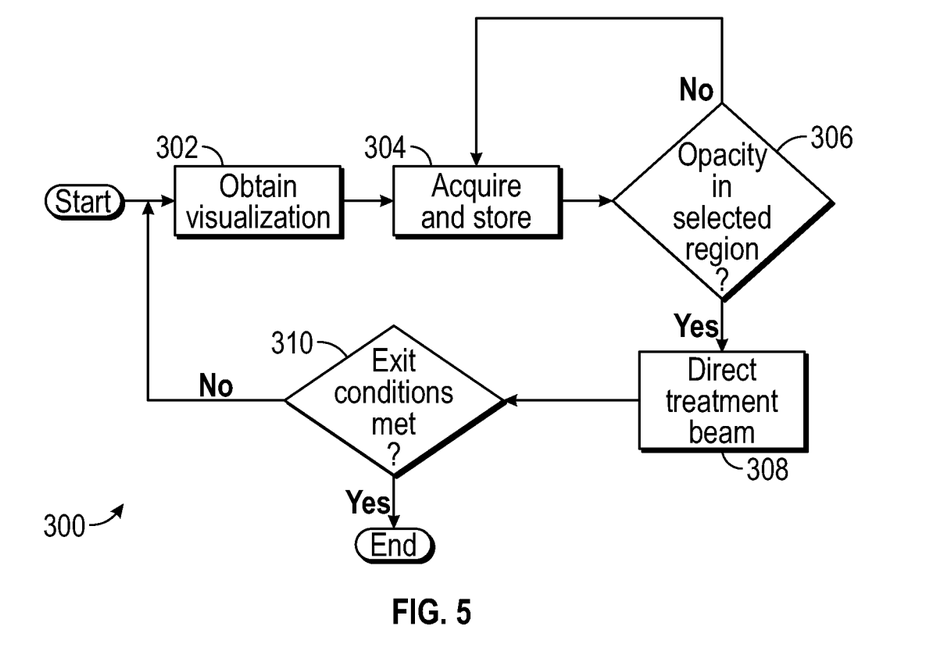
FIG. 5 is a schematic flowchart of a method executable by the controller of FIG. 1.

Referring now to FIG. 5, a flow chart of method 300 executable by the controller C of FIG. 1 is shown. Method 300 need not be applied in the specific order recited herein and some blocks may be omitted. The memory M can store controller-executable instruction sets, and the processor P can execute the controller-executable instruction sets stored in the memory M.

Per block 302 of FIG. 5, the controller C is configured to obtain visualization data of the eye 16 via the visualization module 12. The image stream from the visualization module 12 may be sent to the module processor 44 and/or the controller C, which may be configured to prepare the image stream. The controller C may be configured to store video and/or stereoscopic video signals into a video file and stored to memory M.

Per block 304 of FIG. 5, the controller C is configured to acquire one or more defining parameters of the media opacity 26, based in part on the visualization data from block 302. The defining parameters include a respective shape and a respective size of each of the media opacities 26. In other words, the controller C is configured to extract structural features, such as shape and size, of the media opacity 26. Each media opacity 26 includes a separate set of defining parameters. In some embodiments, the defining parameters may include a depth d (see FIG. 2) of the media opacity 26, along the central axis A, from a preselected reference plane. Also, per block 304, the controller C is configured to store the defining parameters related to multiple ones of the media opacity 26.

Figure 6:
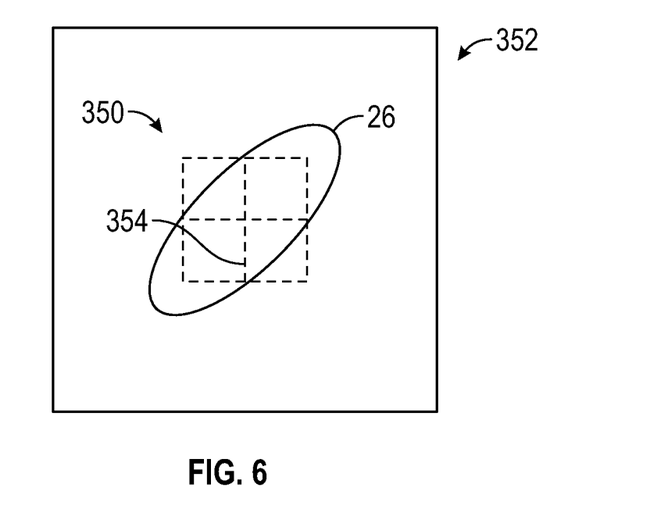
FIG. 6 is a schematic diagram of an example real-time viewing window implemented by the system of FIG. 1.

Per block 306 of FIG. 5, the controller C is configured to determine when a threshold portion of the media opacity 26 is within a predefined target zone 350 of a real-time viewing window 352. FIG. 6 is a schematic example of a real-time viewing window 352 and predefined target zone 350. The real-time viewing window 352 is configured to reflect the visualization data from the visualization module 12 in real-time. In one example, the threshold portion is 50%. The controller C makes this identification based in part on the defining parameters from block 304. The respective shapes of the real-time viewing window 352 and the predefined target zone 350 may be rectangular or circular and may be varied as desired.

Referring to FIG. 6, the real-time viewing window 352 may include crossed laser lines 354 to aid focusing and improving visibility near transparent tissue. In one example, the crossed laser lines 354 emit a green color. In some embodiments, the controller C does not keep track of the real-time location of the media opacity 26 and relies solely upon detection of the threshold portion of the media opacity 26 within the predefined target zone 350.

If the media opacity 26 is within the predefined target zone 350, the method 300 proceeds to block 308, where the treatment beam 32 is directed towards the media opacity 26 in order to incise the media opacity 26. The controller C may be configured to send a signal to the laser module 14 to precisely target the focus of the treatment beam 32 to the media opacity 26. If the media opacity 26 is not within the predefined target zone, the method 300 loops back to block 306.

The laser pulses from the treatment beam 32 may be uniformly targeted within a specific treatment volume, which may be smaller or larger than the media opacity 26. The treatment beam 32 may be delivered in various patterns based on the application at hand. For example, the treatment beam 32 may be delivered as a linearly distributed array of spots in a single plane. The treatment beam 32 may be delivered as a small angle pattern or circular pattern for some types of media opacity 26 (e.g. Weiss ring). The laser settings may include a single-burst, multi-burst, or continuous delivery. As noted above, the laser module 14 may include a MOPA architecture using photonics crystal fibers and SESAM. Pulse rates that are in the KHz range in a MOPA architecture appear continuous to a surgeon. The laser pulse energy, the position of spots hit, and treatment volume may be optimized to achieve the highest effectiveness of breaking up the media opacity 26 while minimizing various factors, such as the formation and spread of gas bubbles, laser exposure, proximity to the back of the eye 16 and procedure time.

From block 308, the method 300 proceeds to block 310 to assess whether one or more exit conditions have been met. An example exit condition may be that the media opacity 26 has reached a minimum acceptable size. If the exit conditions have been met, the method 300 is ended. If not, the method 300 loops back to block 302.

In some embodiments, the controller C may be configured to obtain a speckle pattern of scattered light originating from the treatment beam 32, with the scattered light being sized at about a wavelength of the treatment beam 32. The media opacity 26 scatters light when the treatment beam 32 is directed towards it. The scattered light originates from varying positions within the eye 16 and travels different lengths, resulting in constructive and destructive interference. The interference varies randomly in space, producing a randomly varying intensity pattern referred to as speckle. In other words, speckle occurs due to interference between coherent light rays scattered with different phases and amplitudes. The scattered light causes material irregularities which may be sized on the order of a wavelength of the laser light illuminating the scattering material.

The laser module 14 may include other modes of operation. For example, the laser module 14 may include a manual mode where the surgeon manually identifies the media opacity 26 in pitch, yaw and depth, presses a trigger to capture an image of the media opacity 26 via the visualization module 12 and activates the laser module 14. The laser module 14 fires if no movement of the media opacity 26 or eye 16 is detected. The manual mode may include closed loop tracking.

In alternative embodiments, the visualization module 12 may incorporate a slit based confocal imaging module using infrared light with a rolling shutter, as opposed to an opto-mechanical slit. The slit confocal imaging requires less light than a confocal point source. Confocal imaging decreases depth of field which is advantageous for vitreous visualization and decreases scattered light, thereby improving the signal to noise ratio. The system 10 may include a slit scanning confocal stereo visualization option with a spatial light modulator 200 using reflected light. In some embodiments, the visualization module 12 may employ an annular phased array 3D ultrasound unit available to those skilled in the art.

Figure 7:
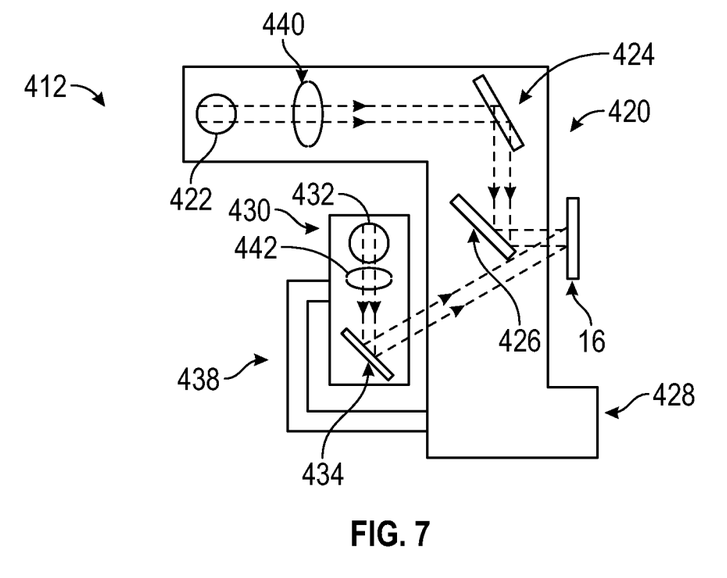
FIG. 7 is a schematic fragmentary diagram of a visualization module that may be employed by the system of FIG. 1, in accordance with yet another embodiment.

Referring to FIG. 7, a visualization module 412 is shown in accordance with yet another embodiment. The visualization module 412 includes a coaxial illumination unit 420 having a slit lamp 422 generating a respective beam that interacts with a first reflector 424 and a second reflector 426. At least one of the first reflector 424 and the second reflector 426 includes a spatial light modulator 200 (shown in FIG. 4). The first reflector 424 and the second reflector 426 may be coaxial to the central axis A of FIG. 1. Referring to FIG. 7, the visualization module 412 includes an oblique illumination unit 430 having a slit lamp 432 generating a respective beam that interacts with a reflector 434. The reflector 434 includes a spatial light modulator 200 (shown in FIG. 4). The oblique illumination unit 430 may be rotatable relative to the target site or eye 16 via a swivel arm 438 attached to a housing 428. In other words, the reflector 434 may be rotatable off-axis relative to the central axis A. The coaxial illumination unit 420 and oblique illumination unit 430 may include various lenses 420, 422 for optical focusing and other accessories (not shown) for magnification and steering.

It is understood that the different characteristics described in one embodiment may be used independently of one another or may be combined with one or more desired characteristics from other embodiments. For example, the spatial light modulator 200 may be used in an adaptive optics approach for a visualization only application (without laser vitreolysis). The spatial light modulator 200 may be used with or without the corneal interfacing member 80. The spatial light modulator 200 may be employed in a coaxial or oblique illumination path and/or in the stereo/optical surgeon visualization path.

The controller C of FIG. 1 may be an integral portion of, or a separate module operatively connected to, other controllers integrated with the laser module 14 and the visualization module 12, 112. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for treating a media opacity in a vitreous media of an eye, the system comprising:
    a visualization module adapted to provide visualization data of a portion of the eye via one or more viewing beams;

a laser module adapted to selectively generate a treatment beam directed towards the media opacity in order to disrupt the media opacity;

wherein the laser module and the visualization module have a shared aperture for guiding the treatment beam and the one or more viewing beams towards the eye, the shared aperture being centered about a central axis;

a controller in communication with the visualization module and the laser module, the controller having a processor and a tangible, non-transitory memory on which instructions are recorded; and wherein execution of the instructions by the processor causes the controller to acquire one or more defining parameters of the media opacity based at least partially on the visualization data, the one or more defining parameters including a shape and a size of the media opacity; and wherein the controller is further configured to:
prior to acquiring the one or more defining parameters of the media opacity, define a predefined target zone of a real-time viewing window of the visualization module, the predefined target zone being smaller than the real-time viewing window;

determine when a threshold portion of the media opacity has not moved from the predefined target zone based at least partially on the one or more defining parameters; and in response to determining when a threshold portion of the media opacity has not moved from a predefined target zone, direct the treatment beam towards the media opacity in the predefined target zone.

2. The system of claim 1, further comprising:
a sensor in communication with the controller and configured to detect motion of a patient; and
wherein the controller is configured to disable the treatment beam when motion of the patient is detected by the sensor.

3. The system of claim 1, wherein the controller is configured to obtain a speckle pattern of scattered light originating from the treatment beam, the scattered light being sized at about a wavelength of the treatment beam.

4. The system of claim 1, wherein the one or more defining parameters include a depth of the media opacity.

5. The system of claim 1, further comprising:
a joystick unit in communication with the controller; and
wherein the joystick unit is configured to enable depth selection of the visualization module.

6. The system of claim 1, wherein the treatment beam includes a plurality of ultra-short laser pulses.

7. The system of claim 6, wherein the plurality of ultra-short laser pulses defines a respective time duration of between about a femtosecond and about 50 picoseconds.

8. The system of claim 1, wherein the treatment beam travels in a direction parallel to the central axis.

9. The system of claim 1, wherein the treatment beam travels at an off-axis angle from the central axis, the off-axis angle being at or above 25 degrees.

10. The system of claim 1, further comprising:
a corneal interfacing member positioned in close proximity to a cornea of the eye, the corneal interfacing member being configured to decrease a depth of field for the treatment beam.

11. The system of claim 1, wherein:
the visualization module is configured to employ electromagnetic radiation reflected from one or more optical devices prior to striking the eye, the one or more optical devices being positioned such that only oblique rays strike the eye and central rays are blocked.

12. The system of claim 1, wherein:
the visualization module includes a light source, a mirror unit, a first polarizer and a second polarizer, the second polarizer being oriented at 90 degrees with respect to the first polarizer;
the first polarizer is adapted to polarize at least one incident beam from the light source to produce a linearly polarized light wave; and
the mirror unit is adapted to direct the linearly polarized light wave onto the eye; and
the second polarizer is positioned such that a reflected beam exiting the eye is projected onto the second polarizer.

13. The system of claim 12, wherein the visualization module further includes:
a birefringent prism configured to intercept the linearly polarized light wave prior to the linearly polarized light wave striking the eye, the birefringent prism being configured to intercept the reflected beam prior to the reflected beam being projected onto the second polarizer.

14. The system of claim 1, wherein the visualization module includes an electronically controlled liquid lens having a response time of between 1 and 5 milliseconds.

15. The system of claim 1, further comprising:
a wavefront sensor configured to determine ocular aberrations in the one or more viewing beams exiting the eye; and
a deformable mirror configured to shape a wavefront of the treatment beam based in part on the ocular aberrations determined by the wavefront sensor.

16. The system of claim 1, further comprising:
a spatial light modulator adapted for shaping at least one of a respective phase and a respective amplitude of the one or more viewing beams, the spatial light modulator being located coaxial to the central axis.

17. The system of claim 1, further comprising:
a spatial light modulator adapted for shaping at least one of a respective phase and a respective amplitude of the one or more viewing beams, the spatial light modulator being rotatable off-axis relative to the central axis.

18. The system of claim 1, wherein the threshold portion includes 50%.

19. A method for treating a media opacity in an eye with a system having a visualization module, a laser module and a controller with a processor and a tangible, non-transitory memory on which instructions are recorded, the method comprising:
adapting the laser module to selectively generate a treatment beam directed towards the media opacity;
obtaining visualization data of the eye, via the visualization module;
acquiring and storing one or more defining parameters of the media opacity based at least partially on the visualization data, the one or more defining parameters including a shape and a size of the media opacity;
prior to acquiring the one or more defining parameters of the media opacity, defining a predefined target zone of a real-time viewing window of the visualization module, the predefined target zone being smaller than the real-time viewing window;
determining when a threshold portion of the media opacity has not moved from the predefined target zone based at least partially on the one or more defining parameters, via the controller; and directing the treatment beam towards the media opacity when the threshold portion of the media opacity has been determined to have not moved from the pre-defined target zone, via the laser module, in order to disrupt the media opacity.

20. The method of claim 19, wherein the threshold portion includes 50%.

* * * * *